US 11,653,368 B2

(12) United States Patent
Harris

(10) Patent No.: US 11,653,368 B2
(45) Date of Patent: May 16, 2023

(54) SELECTIVE OVER THE AIR RECONFIGURATION OF UNICAST MULTIMEDIA BROADCAST SINGLE FREQUENCY NETWORK (MBSFN)

(71) Applicant: NOKIA SOLUTIONS AND NETWORKS OY, Espoo (FI)

(72) Inventor: John Harris, Whitefish Bay, WI (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 107 days.

(21) Appl. No.: 17/205,583

(22) Filed: Mar. 18, 2021

(65) Prior Publication Data

US 2021/0306814 A1    Sep. 30, 2021

(30) Foreign Application Priority Data

Mar. 31, 2020   (FI) ...................................... 20205328

(51) Int. Cl.
*H04W 72/00*   (2009.01)
*H04W 4/06*    (2009.01)
(Continued)

(52) U.S. Cl.
CPC ........... *H04W 72/005* (2013.01); *H04L 5/003* (2013.01); *H04L 5/0058* (2013.01);
(Continued)

(58) Field of Classification Search
CPC ............. H04W 72/005; H04W 72/042; H04W 72/0446; H04W 72/0486; H04W 72/0493;
(Continued)

(56) References Cited

U.S. PATENT DOCUMENTS

2015/0009925 A1    1/2015  Park et al.
2018/0049161 A1*   2/2018  Lee ....................... H04L 12/189

FOREIGN PATENT DOCUMENTS

CN    103688476 A      3/2014
CN    105493592 A      4/2016
EP      2276276 A2 *   1/2011   .......... H04W 72/005

OTHER PUBLICATIONS

B. A. Salihu, Y. Dacheng, Z. Xin, and S. Zubair, "Evolution of Physical Downlink Control Channel ( PDCCH ) for LTE-Advanced Systems,"vol. 6, No. 1, pp. 20-36, 2014. (Year: 2014).*

(Continued)

*Primary Examiner* — Joshua Kading
(74) *Attorney, Agent, or Firm* — Squire Patton Boggs (US) LLP

(57) ABSTRACT

Systems, methods, apparatuses, and computer program products for selective over the air reconfiguration of unicast MBSFN are provided. One method may include detecting whether a system is physical downlink control channel (PDCCH) limited. When it is detected that the system is physical downlink control channel (PDCCH) limited, the method may include reducing a percentage of subframes that are using unicast multimedia broadcast single frequency network (MBSFN). When it is detected that the system is not physical downlink control channel (PDCCH) limited, the method may include increasing the percentage of subframes that are using unicast multimedia broadcast single frequency network (MBSFN).

16 Claims, 3 Drawing Sheets

(51) Int. Cl.
*H04W 72/04* (2009.01)
*H04L 12/18* (2006.01)
*H04W 72/12* (2009.01)
*H04L 5/00* (2006.01)
*H04W 24/02* (2009.01)
*H04W 72/0446* (2023.01)
*H04W 72/1273* (2023.01)

(52) U.S. Cl.
CPC ............. *H04L 12/189* (2013.01); *H04W 4/06* (2013.01); *H04W 24/02* (2013.01); *H04W 72/042* (2013.01); *H04W 72/0446* (2013.01); *H04W 72/0493* (2013.01); *H04W 72/1252* (2013.01); *H04W 72/1273* (2013.01)

(58) Field of Classification Search
CPC ......... H04W 72/1252; H04W 72/1273; H04W 4/06; H04W 24/02; H04L 5/0001; H04L 5/003; H04L 5/0058; H04L 12/18; H04L 12/189
See application file for complete search history.

(56) References Cited

OTHER PUBLICATIONS

Extended European Search Report issued in corresponding European Patent Application No. 21162546.2 dated Aug. 3, 2021.
Nokia et al., "Reusing unused MBSFN subframes for unicast transmission"; 3GPP Draft; R1-093889; 3rd Generation Partnership Project (3GPP); Oct. 12, 2009, XP050388393.
Nokia et al., "Group Scheduling Mechanisms to Support 5G Multicast/Broadcast Services for RRC_Connected UEs"; 3GPP Draft; R1-2008882; 3rd Generation Partnership Project (3GPP); vol. RAN WG1, Oct. 23, 2020, XP051945409, Retrieved from the Internet: URL: https://ftp.3gpp.org/tsg_ran/WG1_RL1/TSGR1_103-E/Docs/R1-2008882.zip R1-2008882.doc.
3GPP TS 36.211, 3rd Generation Partnership Project; Technical Specification Group Radio Access Network; Evolved Universal Terrestrial Radio Access (E-URTA); Physical channels and modulation (Release 15), V15.6.0, Jun. 2019.
First Office Action issued in corresponding Chinese Patent Application No. 202110346324.0 dated Feb. 15, 2022, with English summary thereof.

* cited by examiner

SELECTIVE OVER THE AIR RECONFIGURATION OF UNICAST MULTIMEDIA BROADCAST SINGLE FREQUENCY NETWORK (MBSFN)

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to unicast multimedia broadcast single frequency network (MBSFN).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

One embodiment is directed to an apparatus that may include at least one processor and at least one memory comprising computer program code. The at least one memory and computer program code configured, with the at least one processor, to cause the apparatus at least to detect whether a system is physical downlink control channel (PDCCH) limited, when it is detected that the system is physical downlink control channel (PDCCH) limited, to perform a reduction in a percentage of subframes that are using unicast multimedia broadcast single frequency network (MBSFN), and, when it is detected that the system is not physical downlink control channel (PDCCH) limited, to increase the percentage of subframes that are using unicast multimedia broadcast single frequency network (MBSFN).

Another embodiment is directed to a method that may include detecting whether a system is physical downlink control channel (PDCCH) limited, when it is detected that the system is physical downlink control channel (PDCCH) limited, reducing a percentage of subframes that are using unicast multimedia broadcast single frequency network (MBSFN), and, when it is detected that the system is not physical downlink control channel (PDCCH) limited, increasing the percentage of subframes that are using unicast multimedia broadcast single frequency network (MBSFN).

In one example embodiment, the system is physical downlink control channel (PDCCH) limited when at least one of the normal subframe is utilizing all three physical downlink control channel (PDCCH) symbols or the multimedia broadcast single frequency network (MBSFN) subframes are physical downlink control channel (PDCCH) limited with two symbols.

In an example embodiment, the system is not physical downlink control channel (PDCCH) limited when at least one of the normal subframe is not utilizing all three physical downlink control channel (PDCCH) symbols or the multimedia broadcast single frequency network (MBSFN) subframes are not physical downlink control channel (PDCCH) limited with two symbols.

In one example embodiment, the reducing may include reducing the percentage of subframes that are using unicast multimedia broadcast single frequency network (MBSFN) only when a check indicates that it is acceptable to perform another system information block (SIB) update.

In an example embodiment, the reducing may include switching of small grant user equipment (UEs) from transmission mode 9 (TM9) to transmission mode 4 (TM4).

In one example embodiment, the switching of small grant user equipment (UEs) from transmission mode 9 (TM9) to transmission mode 4 (TM4) may include: when one subframe type is more physical downlink control channel (PDCCH) limited than an other subframe type, identifying at least one user equipment (UE) with small grants and better radio frequency (RF) conditions and transition the at least one user equipment (UE) from transmission mode 9 (TM9) to transmission mode 4 (TM4).

In an example embodiment, the increasing may include increasing of the percentage of subframes that are using unicast multimedia broadcast single frequency network (MBSFN) only when a check indicates that it is acceptable to perform another system information block (SIB) update.

In one example embodiment, the check may include determining that there are no more than two system information block (SIB) updates per hour.

Another embodiment is directed to an apparatus that may include detecting means for detecting whether a system is physical downlink control channel (PDCCH) limited, when the detecting means detects that the system is physical downlink control channel (PDCCH) limited, reducing means for reducing a percentage of subframes that are using unicast multimedia broadcast single frequency network (MBSFN), and, when the detecting means detects that the system is not physical downlink control channel (PDCCH) limited, increasing means for increasing the percentage of subframes that are using unicast multimedia broadcast single frequency network (MBSFN).

Another embodiment may be directed to an apparatus including circuitry configured to: detect whether a system is physical downlink control channel (PDCCH) limited, when it is detected that the system is physical downlink control channel (PDCCH) limited, to perform a reduction in a percentage of subframes that are using unicast multimedia broadcast single frequency network (MBSFN), and, when it is detected that the system is not physical downlink control channel (PDCCH) limited, to increase the percentage of subframes that are using unicast multimedia broadcast single frequency network (MBSFN).

Another embodiment is directed to a computer readable medium comprising program instructions stored thereon for performing at least the following: detecting whether a system is physical downlink control channel (PDCCH) limited, when it is detected that the system is physical downlink control channel (PDCCH) limited, reducing a percentage of subframes that are using unicast multimedia broadcast single frequency network (MBSFN), and, when it is detected that the system is not physical downlink control channel (PDCCH) limited, increasing the percentage of subframes that are using unicast multimedia broadcast single frequency network (MBSFN).

BRIEF DESCRIPTION OF THE DRAWINGS

For proper understanding of example embodiments, reference should be made to the accompanying drawings, wherein.

DETAILED DESCRIPTION

Figure 1:
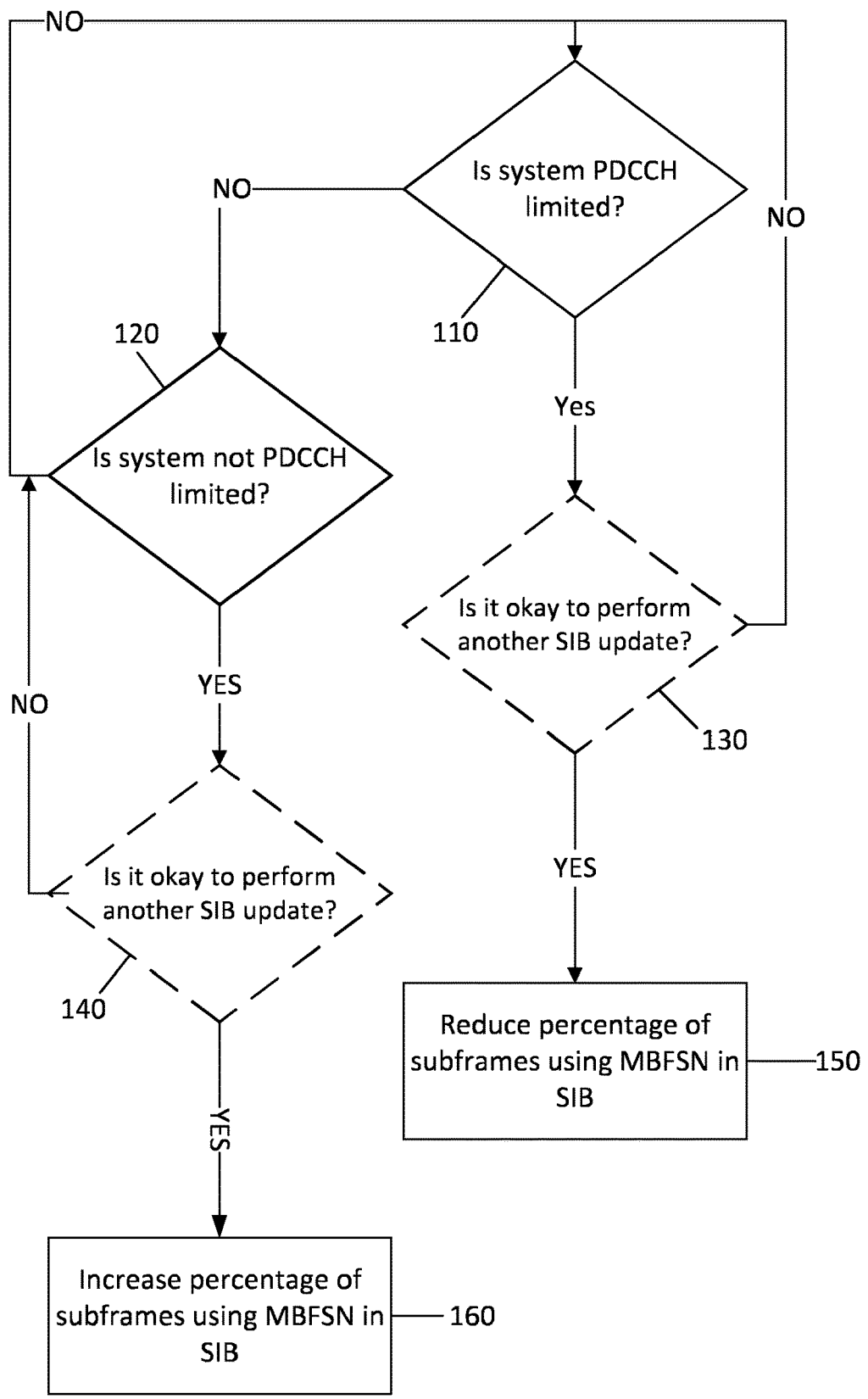
FIG. 1 illustrates an example flow diagram of a method, according to one embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for selective over the air reconfiguration of unicast MBSFN, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Some embodiments described herein provide a method to maximize performance of a physical downlink control channel (PDCCH) limited system and non PDCCH limited system with a unicast MBSFN. An example method may include, in response to a network detecting that the system is PDCCH limited, i.e., normal subframe (nsf, i.e., not an MBSFN subframe) is PDCCH limited utilizing all three PDCCH symbols and MBSFN subframes are PDCCH limited with 2 symbols, performing a reduction in percentage of subframes which are using unicast MBSFN, if a check indicates that it is acceptable to perform another system information block (SIB) update. Also, an example method may include switching small grant UEs from transmission mode 9 (TM9) to TM4. Further, example embodiments reduce percentage of subframes which are using MBSFN only, if a check indicates that is acceptable to perform another SIB update. Moreover, in response to the network detecting that the system is not PDCCH limited, an embodiment may perform a check to determine that it is okay to perform another SIB update and increase the percentage of subframes which are using the unicast MBSFN.

Considerations are being made for transmitting TM9 unicast traffic over MBSFN subframes, and a new feature that would cover switching transmission mode based upon whether the UE is a small grant UE (more PDCCH intensive, i.e., using a relatively high amount of PDCCH resources relative to the amount of PRBs transferred as may be the case with certain lower bit rate UEs e.g. with smaller more frequent grants such as lower bit rate GBR or VoLTE call). Additionally, unicast over MBSFN is an important feature because it enables reducing the amount of cell-specific reference signal (CRS) interference improving coverage, throughput and capacity.

However, in an example configuration of downlink traffic over MBSFN configuration, only two PDCCH symbols are allowed (one and three symbol not allowed). In other words, when scheduling over MBSFN in that configuration the LTE standard requires always utilizing 2 PDCCH symbols per subframe (sf). Normal subframes allow up to three PDCCH symbols when needed.

It is noted that CRS may refer to the reference signal used by TM4 (also sometimes referred to as CSRS), while channel state information reference symbol (CSI-RS) may refer to the reference signal used by TM9 and TM10. Normal subframes can carry e.g. both TM4 and TM9 traffic. MBSFN subframes can carry e.g. TM9 unicast traffic. Note that Multimedia broadcast multicast service (MBMS) can refer to the non-unicast way in which MBSFN frames can be used, i.e. which is different from the LTE downlink unicast TM9 over MBSFN use discussed further here.

For automatic PDCCH optimization on normal subframes, when scheduling over normal subframes the LTE standard allows utilizing one, two, or three PDCCH symbols per sf (where the number may be automatically selected based upon the PDCCH loading). Each additional PDCCH symbol configured displaces a percentage (e.g., approximately ~10%) of the capacity for carrying, e.g., bearer traffic over the PDSCH. Supporting one PDCCH symbol may be helpful or important because, e.g., when the size of the grants are larger, this enables supporting a higher peak bit rate. As such, additional PDCCH symbols on the normal sf (nsf) are only used when they are needed because, e.g., when there are more smaller grants being allocated during each symbol, and the additional PDCCH symbol(s) is needed to carry those additional grants during each subframe.

Downlink traffic over MBSFN avoids CRS overhead during physical downlink shared channel (PDSCH) symbols. Configuring MBSFN to carry TM9 downlink unicast traffic can generate downlink benefits because it reduces the need to send CRS during those subframes. This may be beneficial from a PDSCH efficiency perspective per symbol in neighboring cells and in that cell for certain TM9 mode UEs.

However, in many cases the existing systems, e.g., with all normal subframes and no MBSFN, can become "PDCCH limited," e.g., as more UEs with small grants may use more PDCCH resources per physical resource block (PRB) granted than other UEs.

It is noted that more PDCCH intensive UEs, i.e., those using a relatively high amount of PDCCH resources relative to the amount of PRBs transferred as may be more typically the case with certain lower bit rate UEs, e.g., with smaller more frequent grants such as lower bit rate GBR or VoLTE call generate more PDCCH load. If a PDCCH intensive UE is TM4, then that will tend to increase the amount of PDCCH loading on the normal subframes. On the other hand, if a PDCCH intensive UE is TM9, then that may tend to reduce the amount of PDCCH loading on the normal subframes.

Downlink traffic over MBSFN may require always using two PDCCH symbols (with one symbol and three symbols not allowed). For example, when scheduling over MBSFN—a LTE standard configuration requires always utilizing 2 PDCCH symbols per sf. This may be inefficient if this reduces the number of PDCCH symbols overall, and the second PDCCH symbols on the MBSFN and the normal subframes are fully utilized. In another case, this may be inefficient if the second PDCCH symbol on the MBSFN is underutilized, while the normal subframes are using all three PDCCH symbols.

It is noted in at least certain cases a TM9 mode UE may be scheduled on both MBSFN and NSF subframes, e.g., such that if there is only one (or more) active UE, then it is possible for that UE to use the entire DL bandwidth (BW) and achieve the full LTE benefits for that UE.

It should be noted that 3GPP standard describes the number of control format indicator (CFI) (PDCCH symbols) with MBSFN and NSF. In particular, MBSFN can have only 2 symbols in cases where, e.g., 4 cell specific antenna ports, and NSF can have 1, 2, or 3 symbols. TM9 UEs Unicast on DL during MBSFN. The physical CFI channel carries information about the number of OFDM symbols used for transmission of PDCCHs in a subframe. The number of CFI (PDCCH symbols) for MBSFN is described in section 6.7 of 3GPP TS 36.211. The set of OFDM symbols possible to use for PDCCH in a subframe is given by Table 6.7-1 of TS 36.211.

An embodiment is directed to a system or method of maximizing performance of PDCCH limited and not PDCCH limited systems with unicast MBSFN (UMBSFN). Unicast MBSFN (UMBSFN) may refer to the MBSFN utilized by LTE for downlink unicast delivery. MBSFN frames may be used for uplink transmissions for all UE types. In certain embodiments, the method may include detecting or determining whether a system is PDCCH limited or not PDCCH limited. For example, a system may be considered a PDCCH limited system when normal subframe is (fully) utilizing all three PDCCH symbols, and/or MBSFN subframes are PDCCH limited (fully utilized) with 2 symbols. Similarly, in one example, a system may be considered a not PDCCH limited system when normal subframe is not fully utilizing all three PDCCH symbols, and/or MBSFN subframes are not PDCCH limited with 2 symbols.

Certain embodiments may be configured to, in response to the network detecting that the system is PDCCH (more) limited, reduce the percentage of subframes which are using unicast MBSFN. In an embodiment, the percentage of subframes using unicast MBSFN are reduced if a check indicates that it is okay to perform another SIB update. According to a further embodiment, in addition to (or in lieu of) reducing the percentage of subframes using unicast MBSFN, if the MBSFN subframes are more PDCCH limited than the normal subframes, then PDCCH intensive UEs may be switched from TM9 to TM4. If the normal subframes are more PDCCH limited than the MBSFN subframes, then PDCCH intensive UEs may be switched from TM4 to TM9.

According to certain embodiments, the switch of small grant (PDCCH intensive) UEs from TM9 to TM4 may include, if one subframe type (e.g., MBSFN subframe) is more PDCCH limited than the other subframe type (e.g., normal subframe), then UE(s) with small grants, e.g., smaller more frequent grants such as lower bit rate GBR or VoLTE call are identified, and the identified UE(s) may be transitioned (e.g., using RRC reconfiguration) from TM9 to TM4 (so as to increase the PDCCH usage on the normal subframes, and decrease the PDCCH usage on the MBSFN subframes), or from TM4 to TM9 (so as to increase the PDCCH usage on the MBSFN subframes, and decrease the PDCCH usage on the normal subframes).

In an embodiment, in response to the network detecting that the system is not PDCCH limited, the percentage of subframes that are using unicast MBSFN may be increased. According to some embodiments, the percentage of subframes that are using unicast MBSFN are increased (only) if a check determines that it is acceptable to perform another SIB update. For example, the check may include the system ensuring that there are no more than a total of two SIB updates per hour.

FIG. 1 illustrates an example flow diagram of a method for selective over the air reconfiguration of unicast MBSFN, according to one example embodiment. In an example embodiment, the flow diagram of FIG. 1 may be performed by a network entity or network node associated with a communication system, such as LTE or 5G NR. For instance, in some example embodiments, the network node performing the method of FIG. 1 may include a base station, eNB, gNB, NG-RAN node, and/or IAB node (DU part).

As illustrated in the example of FIG. 1, the method may include, at 110, detecting or determining whether a system is PDCCH limited. In one example, the system may be determined to be PDCCH limited when normal subframe is utilizing all three PDCCH symbols and/or MBSFN subframes are PDCCH limited with two symbols. The system may be determined to be not PDCCH limited when normal subframe is not utilizing all three PDCCH symbols or MBSFN subframes are not PDCCH limited with two symbols.

In an embodiment, when it is detected that the system is PDCCH limited, the method may optionally include, at 130, determining if another SIB update can be performed. For example, the determining 130 may include determining if the time since a last SIB update is greater than a threshold. According to one embodiment, when it is determined that the system is PDDCH limited and optionally after checking if it is okay to perform another SIB update, the method may include, at 150, reducing a percentage of subframes that are using unicast MBSFN in SIB. In certain embodiments, the reducing 150 may include switching of small grant UEs from TM9 to TM4, e.g., if the MBSFN sf are more PDCCH limited than the normal subframes.

In an embodiment, the method may include, at 120, detecting or determining whether a system is not PDCCH limited. When it is detected that the system is not PDCCH limited, the method may optionally include, at 140, determining if another SIB update can be performed. According to one embodiment, when it is determined that the system is PDDCH limited and optionally after checking if it is okay to perform another SIB update, the method may include, at 160, increasing the percentage of subframes that are using unicast MBSFN. According to some embodiments, the increasing 160 may include switching of small grant UEs from TM4 to TM9, e.g., if the normal sf are more PDCCH limited than the MBSFN subframes.

Figure 2A:
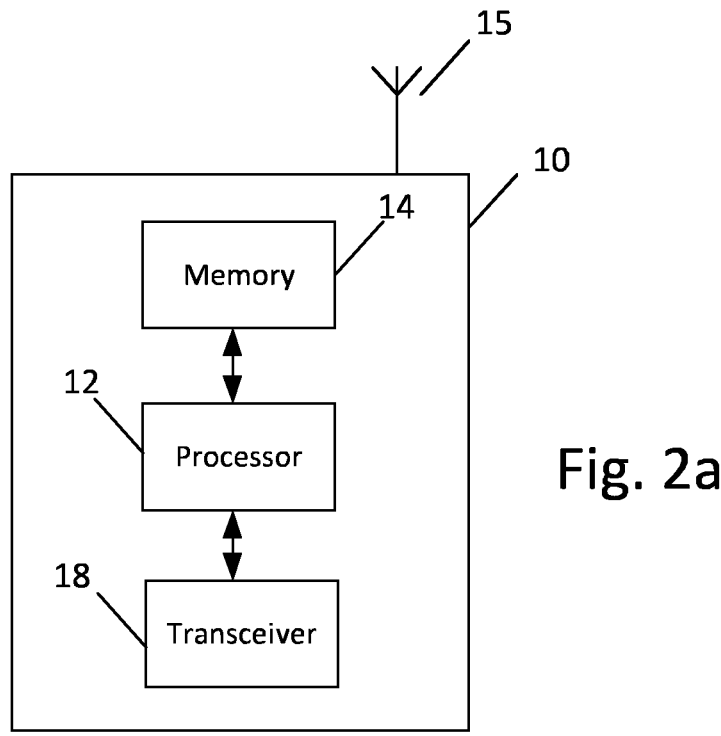
FIG. 2a illustrates an example block diagram of an apparatus, according to an embodiment.

FIG. 2a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), IAB node, and/or WLAN access point, associated with a radio access network, such as a LTE network, 5G or NR. In example embodiments, apparatus 10 may be or may include a NG-RAN node, an eNB in LTE, gNB in 5G, or the like.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 2a.

As illustrated in the example of FIG. 2a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 2a, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (for example, digital-to-analog converters and the like), mappers, a Fast Fourier Transform (FFT) module, and/or the like, e.g., to generate symbols for transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, IAB node, WLAN access point, or the like. For example, in some embodiments, apparatus 10 may be configured to perform one or more of the processes depicted in any of the flow charts or signaling diagrams described herein, such as those illustrated in FIG. 1. In some embodiments, as discussed herein, apparatus 10 may be configured to perform a procedure relating to reconfiguration of unicast MBSFN.

According to this embodiment, apparatus 10 may be controlled by memory 14 and processor 12 to detect or determine whether a system is PDCCH limited. In one example, the system may be determined to be PDCCH limited when normal subframe is utilizing all three PDCCH symbols and/or MBSFN subframes are PDCCH limited with two symbols. It is noted that the system using three PDCCH symbols on the normal subframes does not always necessarily mean that it is PDCCH limited. Rather, it may be more PDCCH limited if those three PDCCH symbols were sufficiently utilized, e.g., at least approximately ~70% of the opportunities to schedule UEs on the PDCCH were being utilized on average. In an embodiment, the system may be determined to be not PDCCH limited when normal subframe is not utilizing all three PDCCH symbols or MBSFN subframes are not PDCCH limited with two symbols.

In an embodiment, when it is detected that the system is PDCCH limited, apparatus 10 may be controlled by memory 14 and processor 12 to optionally determine if another SIB update can be performed. For example, apparatus 10 may be controlled by memory 14 and processor 12 to determine if the time since a last SIB update is greater than a threshold. According to one embodiment, when it is determined that the system is PDDCH limited and optionally after checking if it is okay to perform another SIB update, apparatus 10 may be controlled by memory 14 and processor 12 to reduce a percentage of subframes that are using unicast MBSFN in SIB. In certain embodiments, apparatus 10 may be controlled by memory 14 and processor 12 to reduce the percentage of subframes using unicast MBSFN by switching small grant UEs from TM9 to TM4.

In an embodiment, apparatus 10 may be controlled by memory 14 and processor 12 to detect or determine whether a system is not PDCCH limited. When it is detected that the system is not PDCCH limited, apparatus 10 may be controlled by memory 14 and processor 12 to optionally determine if another SIB update can be performed. According to one embodiment, when it is determined that the system is PDDCH limited and optionally after checking if it is okay to perform another SIB update, apparatus 10 may be controlled by memory 14 and processor 12 to increase the percentage of subframes that are using unicast MBSFN. According to some embodiments, apparatus 10 may be controlled by memory 14 and processor 12 to increase subframes that are using unicast MBSFN by switching more large grant (e.g., bad RF) UEs from TM9 to TM4.

Figure 2B:
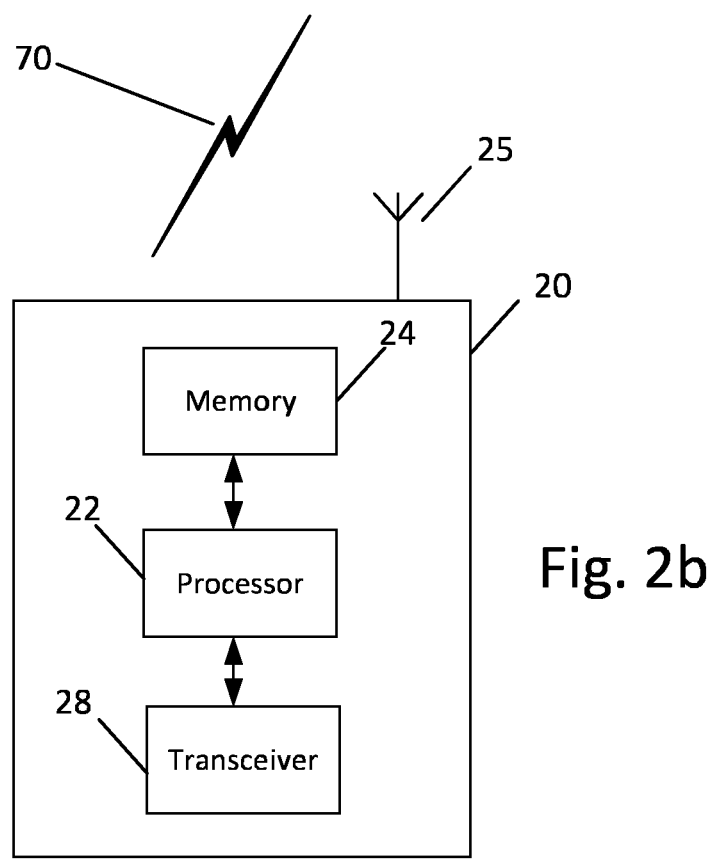
FIG. 2b illustrates an example block diagram of an apparatus, according to another embodiment.

FIG. 2b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 2b.

As illustrated in the example of FIG. 2b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 2b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1. In certain embodiments, apparatus 20 may be configured to perform a procedure for reconfiguration of unicast MBSFN, for instance.

Figure 3:
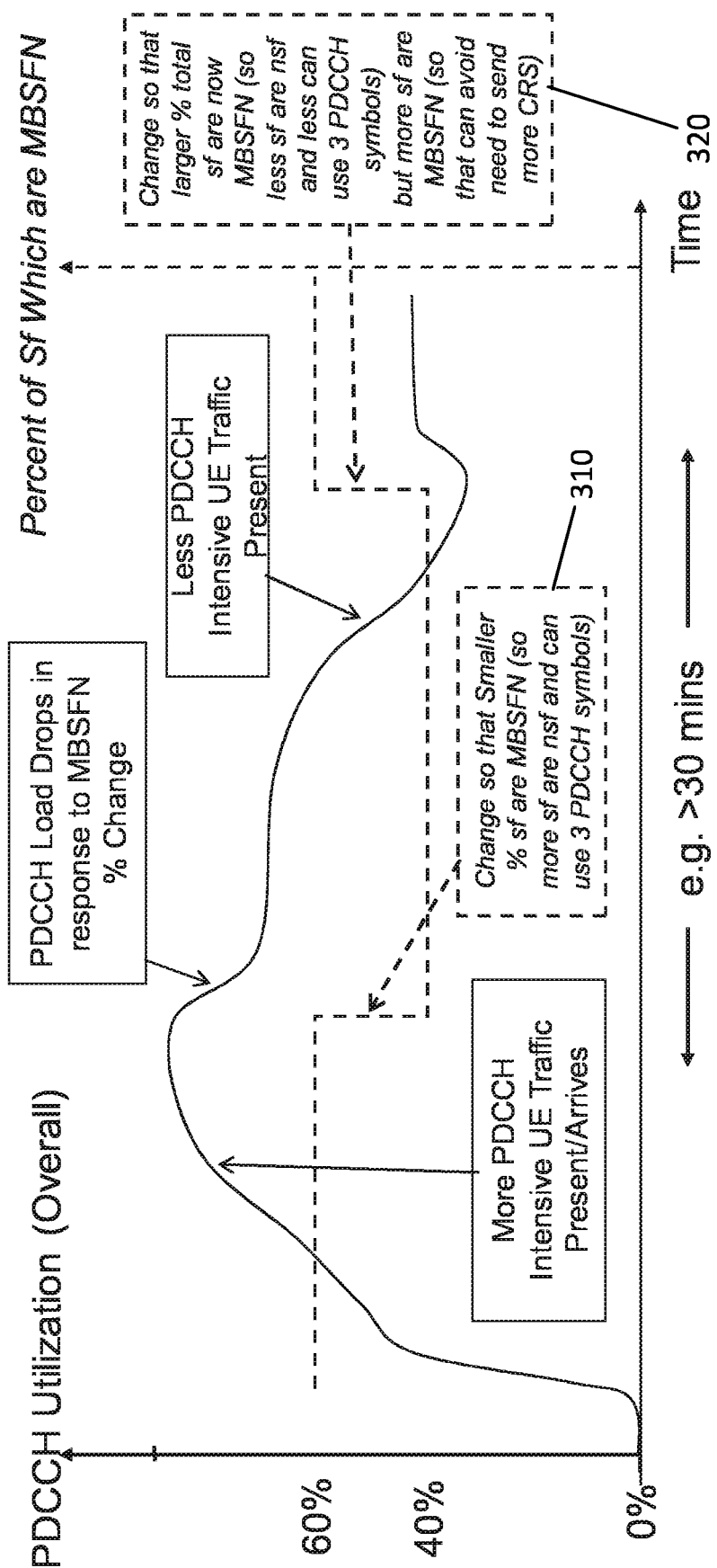
FIG. 3 illustrates an example graph depicting PDCCH utilization over time, according to one example embodiment.

FIG. 3 illustrates an example graph depicting overall PDCCH utilization over time, according to one example embodiment. As illustrated in the example of FIG. 3, where more PDCCH intensive UE traffic is present or arrives, at 310, a smaller percentage of subframes are MBSFN, so a majority of subframes are normal subframes and can use three PDCCH symbols. However, when less PDCCH intensive UE traffic is present, at 320, a larger percentage of subframes are then configured to be MBSFN, (so less subframes are normal subframes, less subframes can use three PDCCH symbols, but more subframes are MBSFN and can avoid sending CRS).

Therefore, certain example embodiments provide several technological improvements, enhancements, and/or advantages over existing technological processes and constitute an improvement at least to the technological field of wireless network control and management. For example, as discussed above, some embodiments provide methods and/or systems for selective of the air reconfiguration of unicast MBSFN that yields 25% capacity gain for customers in a larger fraction of their system. In particular, certain embodiments may provide at least a 25% increase in capacity over unicast with MBSFN when/where PDCCH limited. Furthermore, in an approach where TM9 over MBSFN is supported, example embodiments may increase the capacity in PDCCH limited systems by 25%.

For instance, if the cell is PDCCH limited, then using MBSFN will reduce the overall cell capacity rather dramatically, for example, by 25% in the case where 60% of the subframes are MBSFN because with MBSFN there will only be 2.4 PDCCH symbols on average, whereas without MBSFN there would be three PDCCH symbols on average, so the overall cell capacity with MBSFN could be increased by 25% in this case if the system were to use all normal subframes (i.e., 1.25=3/(2*60%+3*40%)). This automated solution is advantageous at least because this unicast MBSFN feature can be deployed more system-wide, and then in cases where unicast MBSFN is not as advantageous because of the PDCCH limitation it can automatically reduce its usage of MBSFN. Where unicast MBSFN is more advantageous because the PDCCH is not limiting, then it can automatically increase its usage of MBSFN.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In some examples, the functionality provided by some embodiments may be implemented by processing means, controlling means, determining means, storage means, or other appropriate means for performing any of the functionality described herein, and/or the like, included in an apparatus (e.g., apparatus 10 or apparatus 20).

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

I claim:

1. An apparatus, comprising:
at least one processor; and
at least one memory comprising computer program code,
the at least one memory and computer program code configured, with the at least one processor, to cause the apparatus at least to:
detect whether a system is physical downlink control channel (PDCCH) limited;
when it is detected that the system is physical downlink control channel (PDCCH) limited, perform a reduction in a percentage of subframes that are using unicast multimedia broadcast single frequency network (MBSFN) from a first percentage to a second percentage to enable usage of three physical downlink control channel (PDCCH) symbols; and
when it is detected that the system is not physical downlink control channel (PDCCH) limited, increase the percentage of subframes that are using unicast multimedia broadcast single frequency network (MBSFN) from the second percentage to the first percentage to enable usage of less than three of the physical downlink control channel (PDCCH) symbols.

2. The apparatus according to claim 1, wherein the system is physical downlink control channel (PDCCH) limited when at least one of: non-multimedia broadcast single frequency network (non-MBSFN) subframe is utilizing all three of the physical downlink control channel (PDCCH) symbols or multimedia broadcast single frequency network (MBSFN) subframes are physical downlink control channel (PDCCH) limited with two PDCCH symbols.

3. The apparatus according to claim 1, wherein the system is not physical downlink control channel (PDCCH) limited when at least one of: non-multimedia broadcast single frequency network (non-MBSFN) subframe is not utilizing all three of the physical downlink control channel (PDCCH) symbols or multimedia broadcast single frequency network (MBSFN) subframes are not physical downlink control channel (PDCCH) limited with two symbols.

4. The apparatus according to claim 1, wherein the performing of the reduction comprises performing the reduction in the percentage of subframes that are using unicast multimedia broadcast single frequency network (MBSFN) only when a check indicates that it is acceptable to perform another system information block (SIB) update.

5. The apparatus according to claim 4, wherein the check comprises determining that there are no more than two system information block (SIB) updates per hour.

6. The apparatus according to claim 1, wherein the performing of the reduction comprises performing a switch of a user equipment (UE) from transmission mode 9 (TM9) to transmission mode 4 (TM4).

7. The apparatus according to claim 1, wherein the increasing comprises increasing of the percentage of subframes that are using unicast multimedia broadcast single frequency network (MBSFN) only when a check indicates that it is acceptable to perform another system information block (SIB) update.

8. A method, comprising:
detecting whether a system is physical downlink control channel (PDCCH) limited;
when it is detected that the system is physical downlink control channel (PDCCH) limited, reducing a percentage of subframes that are using unicast multimedia broadcast single frequency network (MBSFN) from a first percentage to a second percentage to enable usage of three physical downlink control channel (PDCCH) symbols; and
when it is detected that the system is not physical downlink control channel (PDCCH) limited, increasing the percentage of subframes that are using unicast multimedia broadcast single frequency network (MBSFN) from the second percentage to the first percentage to enable usage of less than three of the physical downlink control channel (PDCCH) symbols.

9. The method according to claim 8, wherein the system is physical downlink control channel (PDCCH) limited when at least one of: non-multimedia broadcast single frequency network (non-MBSFN) subframe is utilizing all three of the physical downlink control channel (PDCCH) symbols or multimedia broadcast single frequency network (MBSFN) subframes are physical downlink control channel (PDCCH) limited with two symbols.

10. The method according to claim 8, wherein the system is not physical downlink control channel (PDCCH) limited when at least one of: non-multimedia broadcast single frequency network (non-MBSFN) subframe is not utilizing all three of the physical downlink control channel (PDCCH) symbols or multimedia broadcast single frequency network (MBSFN) subframes are not physical downlink control channel (PDCCH) limited with two symbols.

11. The method according to claim 8, wherein the reducing comprises reducing the percentage of subframes that are using unicast multimedia broadcast single frequency network (MBSFN) only when a check indicates that it is acceptable to perform another system information block (SIB) update.

12. The method according to claim 11, wherein the check comprises determining that there are no more than two system information block (SIB) updates per hour.

13. The method according to claim 8, wherein the reducing comprises switching of a user equipment (UE) from transmission mode 9 (TM9) to transmission mode 4 (TM4).

14. The method according to claim 8, wherein the increasing comprises increasing of the percentage of subframes that are using unicast multimedia broadcast single frequency network (MBSFN) only when a check indicates that it is acceptable to perform another system information block (SIB) update.

15. An apparatus, comprising:
circuitry configured to perform the method according to claim 8.

16. A computer program embodied on a non-transitory computer-readable medium, said computer program comprising program instructions which, when executed on an apparatus, cause the apparatus to perform at least:
detecting whether a system is physical downlink control channel (PDCCH) limited;
when it is detected that the system is physical downlink control channel (PDCCH) limited, reducing a percentage of subframes that are using unicast multimedia broadcast single frequency network (MBSFN) from a first percentage to a second percentage to enable usage of three physical downlink control channel (PDCCH) symbols; and
when it is detected that the system is not physical downlink control channel (PDCCH) limited, increasing the percentage of subframes that are using unicast multimedia broadcast single frequency network (MBSFN) from the second percentage to the first percentage to enable usage of less than three of the physical downlink control channel (PDCCH) symbols.

* * * * *